United States Patent
Salerno et al.

(10) Patent No.: US 8,356,463 B2
(45) Date of Patent: Jan. 22, 2013

(54) APPARATUS FOR FORMING FLEXIBLE CONTAINERS, DISPENSING FLUID INTO THE CONTAINERS, AND ENCLOSING THE FLUID WITHIN THE CONTAINERS

(75) Inventors: Mark Salerno, Stratford, CT (US); James Corliss, Spofford, NH (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 330 days.

(21) Appl. No.: 12/729,795

(22) Filed: Mar. 23, 2010

(65) Prior Publication Data

US 2011/0072765 A1 Mar. 31, 2011

Related U.S. Application Data

(60) Provisional application No. 61/277,813, filed on Sep. 30, 2009.

(51) Int. Cl.
*B65B 43/04* (2006.01)

(52) U.S. Cl. .................... 53/562; 53/79; 53/403; 53/450

(58) Field of Classification Search .............. 53/79, 450, 53/455, 403, 472, 553, 562
See application file for complete search history.

(56) References Cited

U.S. PATENT DOCUMENTS

| | | | |
|---|---|---|---|
| 4,800,708 A | 1/1989 | Sperry | |
| 4,854,109 A | 8/1989 | Pinarer et al. | |
| 5,022,217 A | 6/1991 | Vilas Boas et al. | |
| 5,027,583 A | 7/1991 | Chelak | |
| 5,060,801 A | 10/1991 | Vilas-Boas | |
| 5,145,069 A | 9/1992 | Vilas Boas et al. | |
| 5,186,905 A | 2/1993 | Bertram et al. | |
| 5,335,483 A | 8/1994 | Gavronsky et al. | |
| 5,376,219 A | 12/1994 | Sperry et al. | |
| 5,950,875 A | 9/1999 | Lee et al. | |
| 6,003,288 A | 12/1999 | Sperry et al. | |
| 6,234,777 B1 | 5/2001 | Sperry et al. | |
| 6,550,229 B2 * | 4/2003 | Sperry et al. | 53/568 |
| 6,617,367 B1 | 9/2003 | Gervais et al. | |
| 6,675,557 B2 | 1/2004 | Sperry et al. | |
| 6,811,059 B2 | 11/2004 | Piucci, Jr. et al. | |
| 6,929,193 B2 | 8/2005 | Ruddy | |
| 7,013,615 B2 | 3/2006 | Piucci, Jr. et al. | |
| 7,225,599 B2 | 6/2007 | Sperry et al. | |
| 2002/0092272 A1 | 7/2002 | Sperry et al. | |

* cited by examiner

*Primary Examiner* — Thanh Truong
(74) *Attorney, Agent, or Firm* — Thomas C. Lagaly

(57) ABSTRACT

An apparatus for forming flexible containers from a film web, dispensing fluid into the containers, and enclosing the fluid within the containers. The film web comprises a pair of juxtaposed film plies, a closed longitudinal edge at which the plies are joined, and an open longitudinal edge at which the plies are not joined.

15 Claims, 10 Drawing Sheets

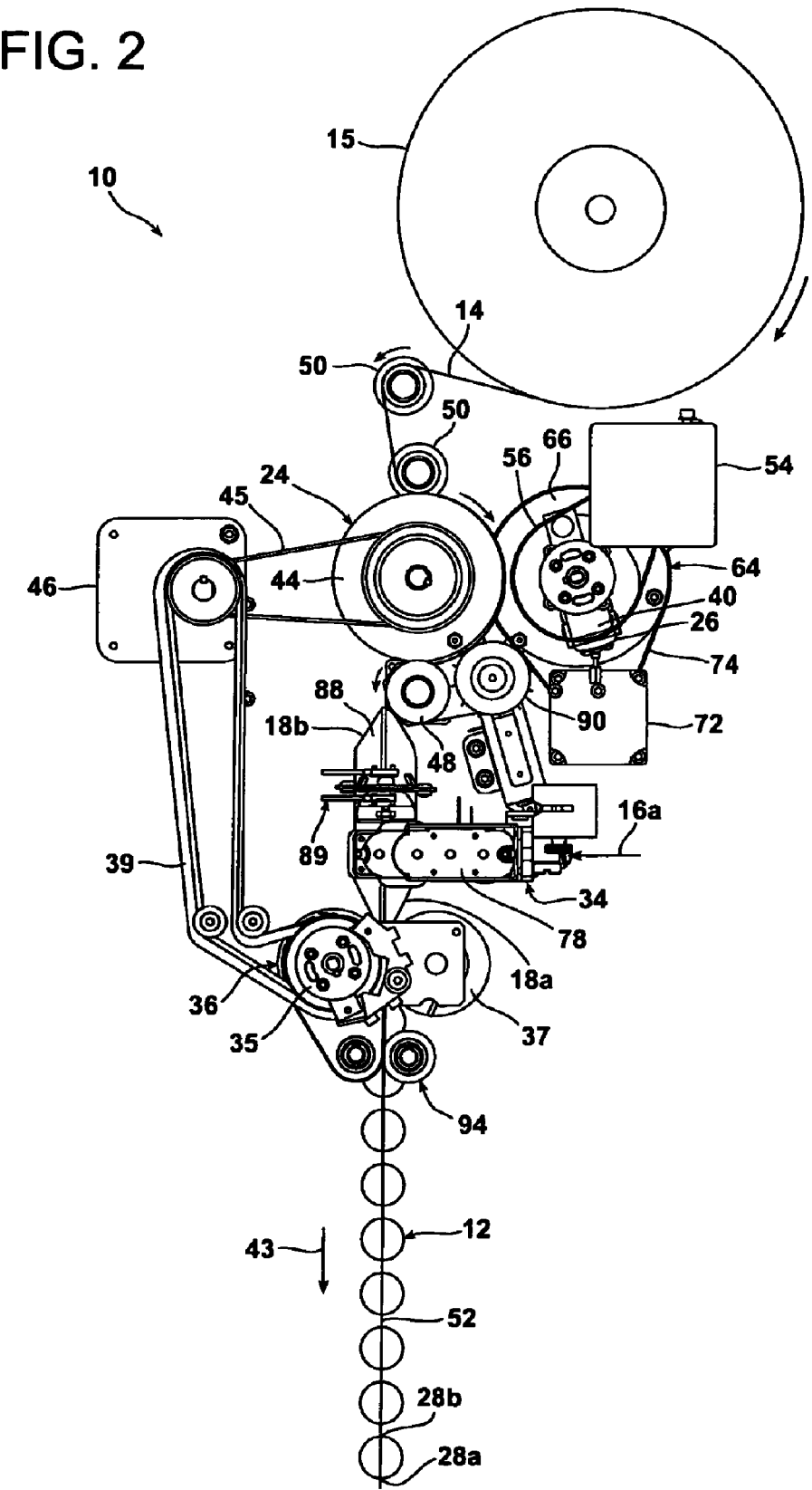

APPARATUS FOR FORMING FLEXIBLE CONTAINERS, DISPENSING FLUID INTO THE CONTAINERS, AND ENCLOSING THE FLUID WITHIN THE CONTAINERS

CROSS-REFERENCE TO RELATED APPLICATIONS

This application claims the benefit of the filing date of U.S. Provisional Patent Application Ser. No. 61/277,813, filed Sep. 30, 2009, the entire disclosure of which is incorporated herein by reference.

BACKGROUND OF THE INVENTION

The present invention relates to foam-in-place packaging and, more particularly, to a simplified and improved apparatus and process for producing foam-in-place packaging cushions and other flexible, fluid-filled containers.

Foam-in-place packaging is a highly useful technique for on-demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foal', which serves to protect the packaged object.

In other types of foam-in-place packaging, an automated apparatus produces flexible bags or other containers from a flexible, plastic film web, and dispenses a foamable composition into the bags as the bags are being formed. As the composition expands into a foam within the bag, the bag is sealed shut and typically dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present invention, and are illustrated, for example, in U.S. Pat. Nos. 4,800,708, 4,854,109, 5,027,583, 5,376,219, and 6,003,288, the contents of each of which are incorporated entirely herein by reference.

A variation of the foregoing 'foam-in-bag' method of creating packaging cushions is to segregate each cushion into one or more containers, which are filled with foamable composition and sealed closed. The foam-filled containers are generally elongated, i.e., tube-shaped, and are separated from adjacent containers by relatively flat regions of the film web, which provide bending regions or hinges for the cushion. While not providing custom-fitting cushions as with standard foam-in-place or foam-in-bag packaging techniques, foam-tube packaging cushions can generally be produced at a higher rate of speed than custom cushions, while still providing the ability to flexibly ensconce the packaged product due to the non-foamed hinge regions of the cushion. These attributes have been found to be advantageous for high-volume packaging applications.

At present, the foregoing foam-tube packaging technique is carried out by modifying conventional foam-in-bag packaging machines to form horizontally-oriented, foam-filled tubes within each packaging cushion. While such modifications have generally proven adequate, shortcomings exist. In the first place, the minimum width of the tubes is currently limited to about 2.5 inches. This is due, in part, to the placement of the foam dispensing apparatus substantially completely inside of the film web, which is conveyed in a vertical direction, with the tubes being horizontally aligned in order to accommodate the placement of the foam dispenser within the web. The spatial constraints of this arrangement do not permit a closer spacing of the transverse seals that form the tubes than about 2.5 inches. It would be desired to produce foam-tube packaging cushions with much smaller tube-widths, e.g., down to about 1 inch or less, which would enhance the flexibility and versatility of foam-tube packaging cushions, e.g., for packaging delicate objects or those having a relatively complex shape.

Additionally, the current foam-tube systems are intermittent, with the film web being stopped each time that a side wall for a tube is formed. Such side walls are created by producing transverse heat-seals, i.e., across the width of the film web, and occur in an alternating fashion with the dispensation of the foamable composition. Spacing between the transverse-seal/side-walls is dependent on the frequency of film-contact with the transverse seal mechanism which, in turn, is dependent on the control of the speed and stoppage of the film web. Such intermittent movement of the film web results in a slower process than would otherwise be desired for many, high-volume applications, in which a continuous/non-intermittent process would be preferred. In addition, control of the spacing of the transverse seals, and therefore of the width of the tubes, is limited. Further, intermittent dispensation of the foam makes it difficult to control both the volume of the foam dispensed into each tube, and also the mixing ratio of the foam precursor components, i.e., the polyol and isocyanate.

Accordingly, there is a need in the art for an improved apparatus for making foam-tube-type packaging cushions, which overcomes the foregoing shortcomings.

SUMMARY OF THE INVENTION

That need is met by the present invention, which provides an apparatus for forming flexible containers from a film web, dispensing fluid into the containers, and enclosing the fluid within the containers, wherein the film web comprises a pair of juxtaposed film plies, a closed longitudinal edge at which the plies are joined, and an open longitudinal edge at which the plies are not joined. The apparatus comprises:

a. a drive mechanism that conveys the film web along a path of travel at a predetermined speed;

b. a first seal mechanism for producing pairs of transverse seals in the film web, the pairs of transverse seals bonding the juxtaposed film plies together and forming the containers therebetween, the first seal mechanism including a seal bar, which forms the transverse seals by contacting the film web at a frequency that is independent of the speed at which the film web is conveyed by the drive mechanism;

c. a perforation mechanism for forming a line of weakness between any two of the containers, the perforation mechanism including a perforation blade, which forms the line of weakness by contacting the film web between transverse seals of adjacent containers at intervals that are independent of the frequency at which the seal bar contacts the film web;

d. a dispensing mechanism for supplying the fluid to the containers, the dispensing mechanism including a dispenser with a discharge nozzle through which fluid exits the dispenser, the dispenser being structured and arranged to position the nozzle within the film web at the open longitudinal edge as the web is conveyed along the path of travel, to thereby dispense the fluid into the containers; and e. a second seal mechanism for forming a longitudinal seal between the film plies adjacent the open longitudinal edge such that the fluid is at least substantially enclosed within the containers.

Advantageously, the foregoing apparatus provides a high degree of control in the width of the containers that are formed, and allows tube-shaped containers to be formed with very small widths, e.g., with diameters of about 1 inch or less. Further, the apparatus allows the dispenser to dispense fluid into the containers as a continuous, non-intermittent flow between two or more containers, thereby improving the speed at which the apparatus forms fluid-filled containers, and also the volume-control and fluid-component ratio control of the dispenser.

These and other aspects, features, and benefits of the invention may be better understood with reference to the following description and accompanying drawings.

BRIEF DESCRIPTION OF THE DRAWINGS

FIG. 2 is a plan view of apparatus 10 as shown in FIG. 1;

DETAILED DESCRIPTION OF THE INVENTION

Figure 1:
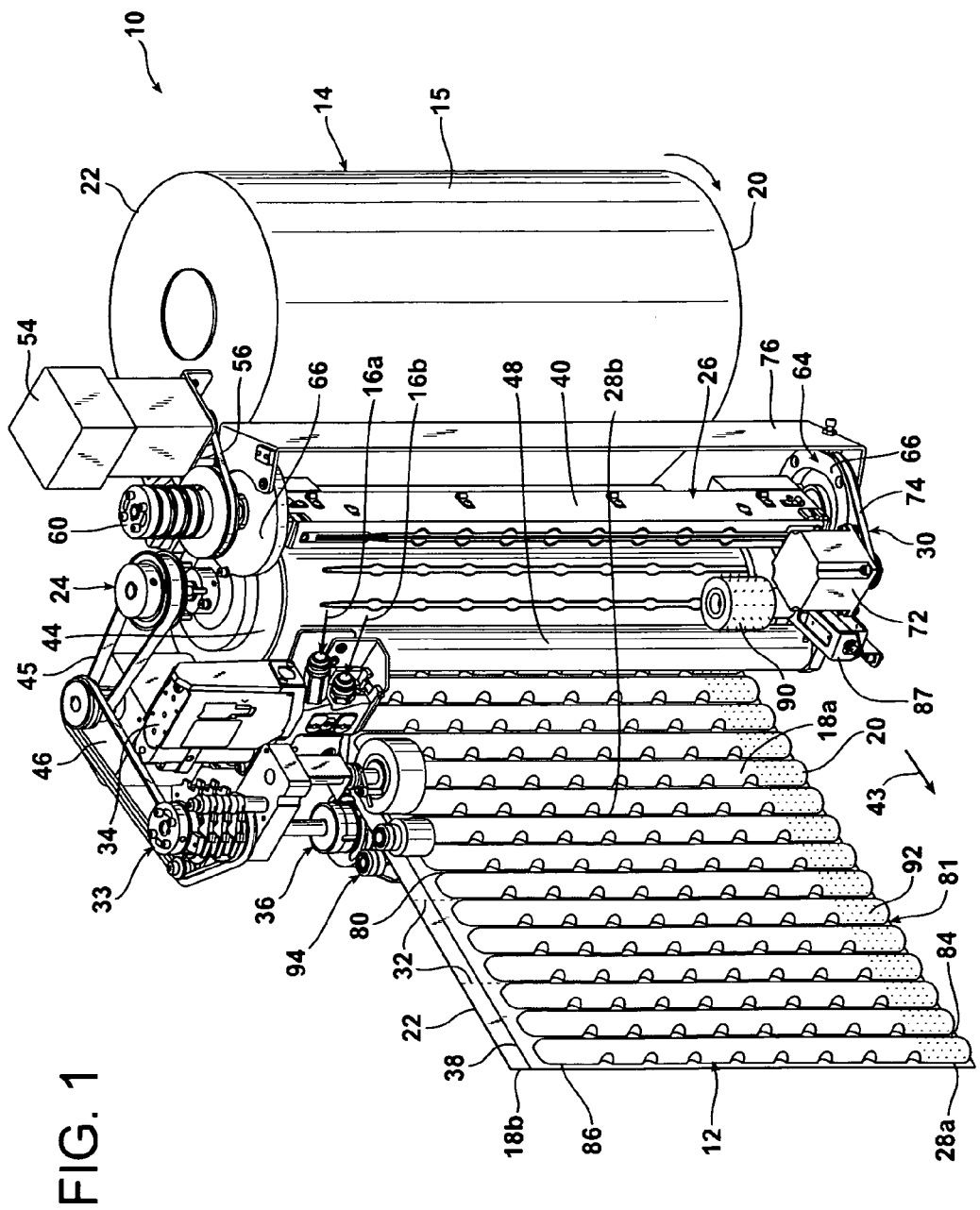
FIG. 1 is a perspective view of an apparatus 10 for forming flexible containers, and dispensing and enclosing fluid therein in accordance with the present invention.

FIGS. 1 and 2 illustrate an apparatus 10 for forming flexible containers 12 from a film web 14, dispensing fluid into the containers 12, and enclosing the fluid within the containers 12. Film web 14 comprises a pair of juxtaposed film plies 18a, b, a closed longitudinal edge 20 at which the film plies are joined, and an open longitudinal edge 22 at which the film plies are not joined. Apparatus 10 generally includes a drive mechanism 24 that conveys the film web 14 along a path of travel at a predetermined speed; a first seal mechanism 26 for producing pairs of transverse seals 28a, b in the film web 14; a perforation mechanism 30 for forming a line of weakness 32 between any two containers 12; a dispensing mechanism 34 for supplying the fluid to the containers 12; and a second seal mechanism 36 for forming a longitudinal seal 38 between the film plies 18a, b adjacent the open longitudinal edge 22.

As shown, film web 14 is in the form of a roll 15, and is withdrawn from the roll and conveyed through apparatus 10 by drive mechanism 24. The path of travel of the film web 14 through apparatus 10 is indicted by the arrows in FIG. 2. Drive mechanism 24 may include a drive roller 44, drive motor 46 to power the rotation of drive roller 44 via belt 45, and pinch roller 48 to provide a compressive force for web 14 between the drive roller 44 and pinch roller 48. Idler rollers 50 may also be included as necessary to direct the web 14 along its travel path through apparatus 10.

As shown, pairs of transverse seals 28 a, b bond the juxtaposed film plies 18a, b together to form the containers 12 therebetween. The first seal mechanism 26 includes a seal bar 40, which forms the transverse seals 28a, b by contacting the film web 14 at a frequency that is independent of the speed at which film web is conveyed by drive mechanism 24. As shown in FIG. 3, the seal bar 40 includes a pair of variable geometry seal wires 42a, b, which create respective transverse seals 28a, b. The bar 40 rotates independently of drive roller 44, on axles 41a, b, via seal bar motor 54 and belt 56, and may be rotated as frequently as desired to bring seal wires 42a, b into contact with film web 14 as many times as desired to create a desired spacing between seal pairs 28a, b, which defines the width "W" of the containers 12 (see, FIG. 4). The contact surface 58 of the seal bar 40 may be curved to match the curvature of drive roller 44. While in contact with film web 14 on roller 44, the speed of contact surface 58 matches that of film web 14 on drive roller 44 so that the seals 28a, b may be properly formed.

Figure 4:
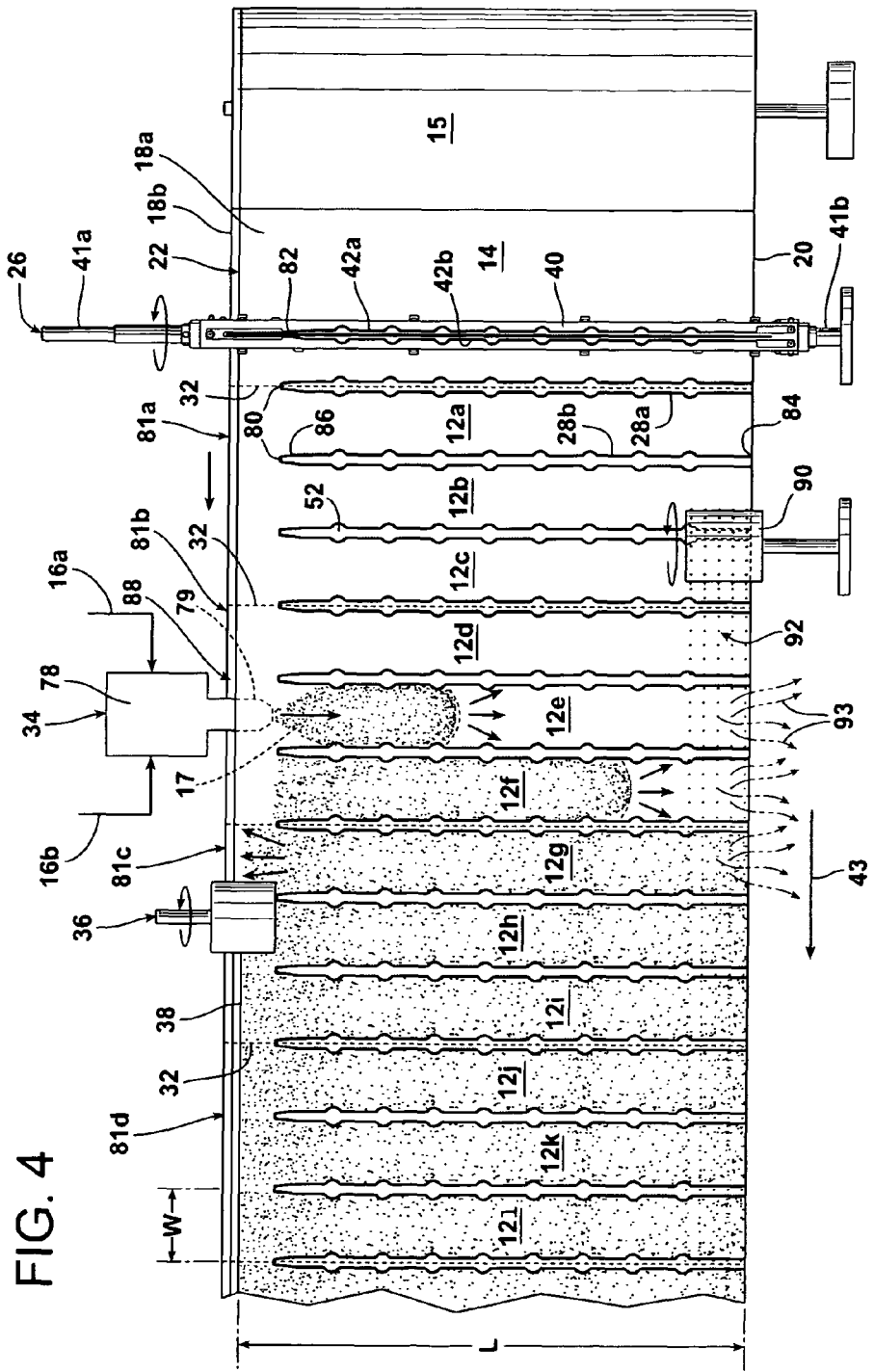
FIG. 4 is a schematic, elevational view of apparatus 10 as shown in FIG. 1.

Once the contact surface 58 rotates out of contact with the web 14, the rotational speed of bar 40 may be increased or decreased as necessary to effect the next set of seals 28a, b with a desired spacing "W" between the just-completed set. Thus, by selectively controlling the frequency at which seal bar 40 contacts film web 14, a desired distance between pairs of transverse seals 28a, b may be effected, thereby forming containers 12 having a desired width dimension "W", i.e., distance between seals 28a, b within a container 12, as shown in FIG. 4 and measured along the longitudinal dimension of the web. The longitudinal dimension of film web 14 is indicated by arrow 43 in FIGS. 2 and 4, which is also the general direction in which the web is conveyed through apparatus 10.

Adjacent containers 12 may be separated by any desired distance, which is determined by the spacing between transverse seal wires 42a, b on seal bar 40. The resultant regions 52 in film web 14 between containers 12 will generally not be filled with fluid, and will thus be relatively flat regions, which may provide bending regions or hinges. This feature is particularly beneficial when containers 12 are filled with foam and two or more are used together to form a packaging cushion. As an example, when containers 12 are in the form of foam tubes with a width "W," e.g., diameter, of about 1 inch, bending region 52 may be about 0.3 inch in length, i.e., such that each foam-tube container 12 is separated from an adjacent foam-tube container by a distance of about 0.3 inch, as measured along the longitudinal dimension 43 of film web 14.

The speed at which film web 14 is conveyed by drive mechanism 24 may also, or alternatively, be selectively controlled, e.g., in conjunction with the selective control of seal bar 40, to achieve further control of the width dimension of the containers 12.

Figure 3A:
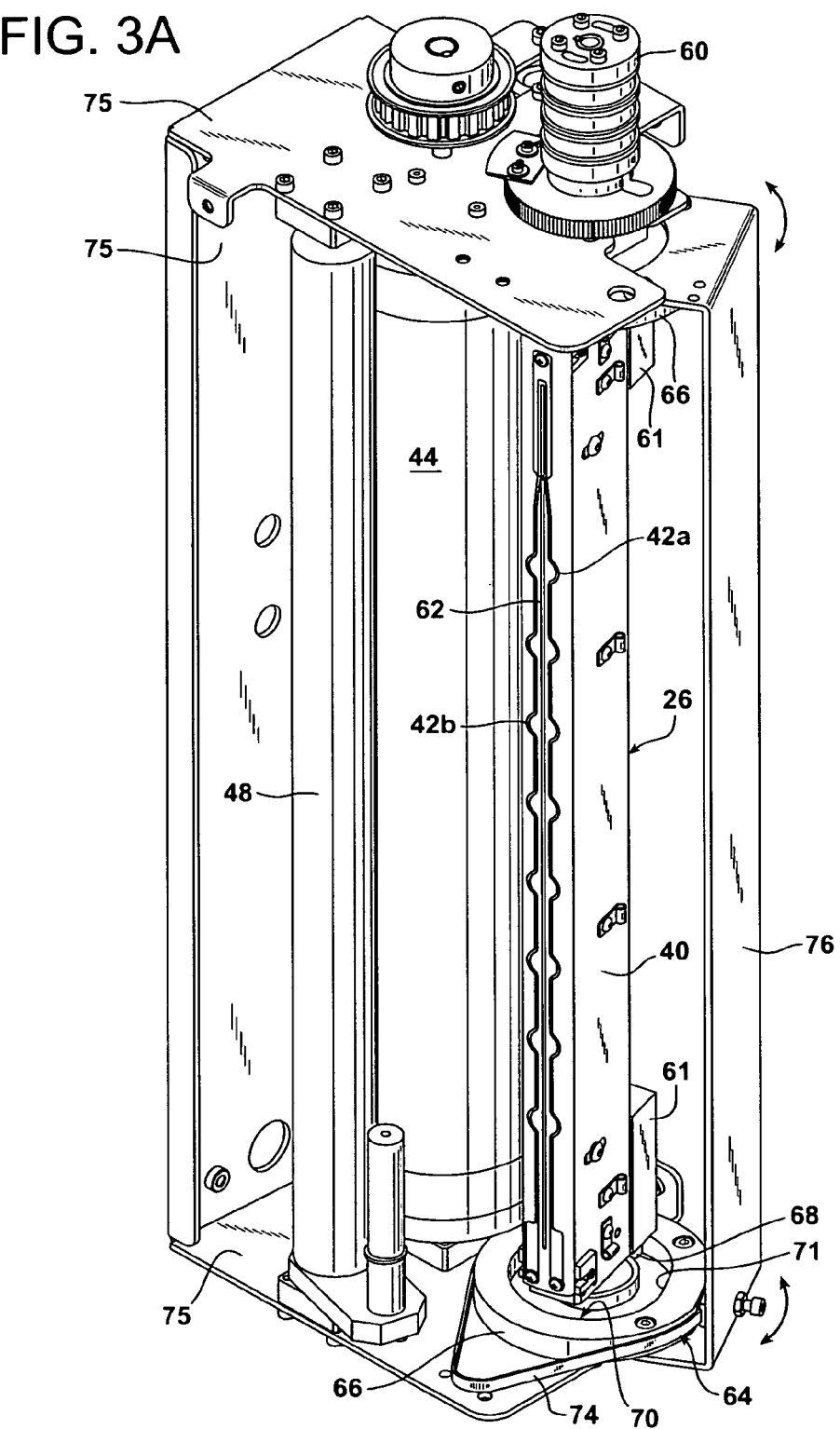
FIGS. 3A-3F are various views of the first seal mechanism 26 and perforation mechanism 30 of apparatus 10.
Figure 3B:
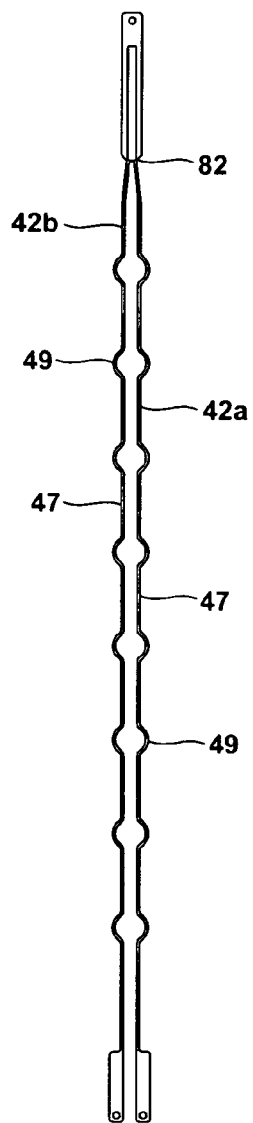
Figure 3C:
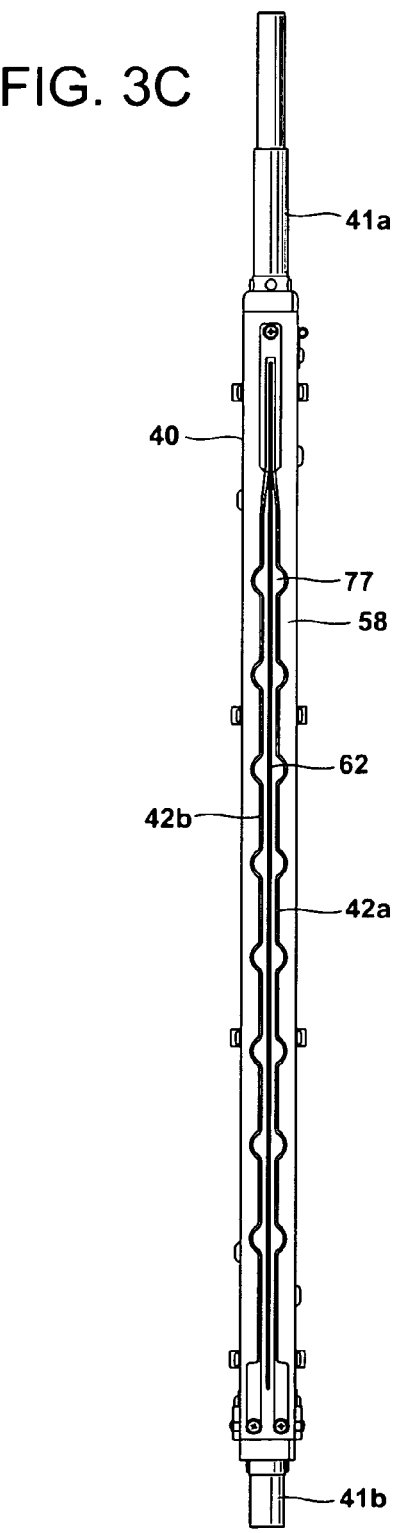

Electricity may be supplied to the transverse seal wires 42a, b via commutator rings 60, e.g., as more fully described in U.S. Pat. No. 7,225,599, the disclosure of which is hereby fully incorporated herein by reference thereto. The transverse seal wires 42a, b may be embodied as also described in U.S. Pat. No. 7,225,599 and, accordingly, may have a substantially linear shape or, as shown in FIG. 3, may have substantially linear regions 47 and non-linear regions 49 (FIG. 3B). As shown in FIGS. 1 and 4, such seal wire design results in containers 12 having a varying width dimension "W" along the vertical length "L" thereof, with the non-linear regions 49 converging within each container to produce relatively thinwidth sections, which facilitate flexibility, e.g., when the containers 12 are employed as packaging cushions.

Referring now to FIGS. 3-4, the perforation mechanism 30 includes a perforation blade 62, which forms lines of weakness 32 by contacting the film web 14 between transverse seals 28a, b of adjacent containers 12 at intervals that are independent of the frequency at which the seal bar 40 contacts web. The perforation blade 62 is integrated into and extendable from the seal bar 40 to contact the film web 14 to form the lines of weakness 32, which allow containers 12, or groups of containers, to be separated from the web. As shown, e.g., in FIG. 3E, the perforation blade 62 may have a serrated film-contact edge 63 to form the lines of weakness 32, e.g., as perforation lines.

The lines of weakness 32 may be formed at any desired interval, independent of the frequency at which the seal bar 40 contacts web 14, despite being integrated into the seal bar. To accomplish this, the perforation mechanism 30 may include a cam device 64, which is selectively controllable to cause the perforation blade 62 to extend from the seal bar 40 and contact the film web 14, thereby producing the lines of weakness 32 at desired intervals, e.g., between every container 12, every other container, every third container, every $6^{th}$ container, etc. The cam device 64 may include a cam 66, a pair of cam followers 68 attached to mounting units 61 at the rear of perforation blade 62 (FIG. 3E), a cam profile 70 with a relatively thick portion 71, a cam motor 72, and a belt 74 to link the motor 72 to the cam 66. The thick portion 71 provides a 'high spot' in the cam profile 70. An identical cam 66 is positioned near the top of the seal bar 40, and the two are linked via a tie bracket 76. As shown in FIG. 3A, both cams 66 may be rotatively attached to mounting bracket 75, along with drive roller 44 and pinch roller 48.

Figure 3D:
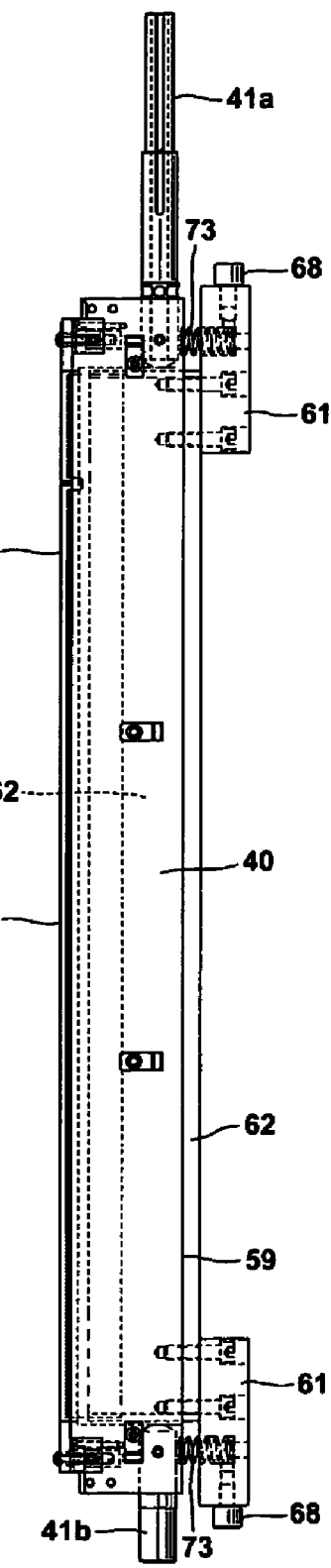
Figure 3E:
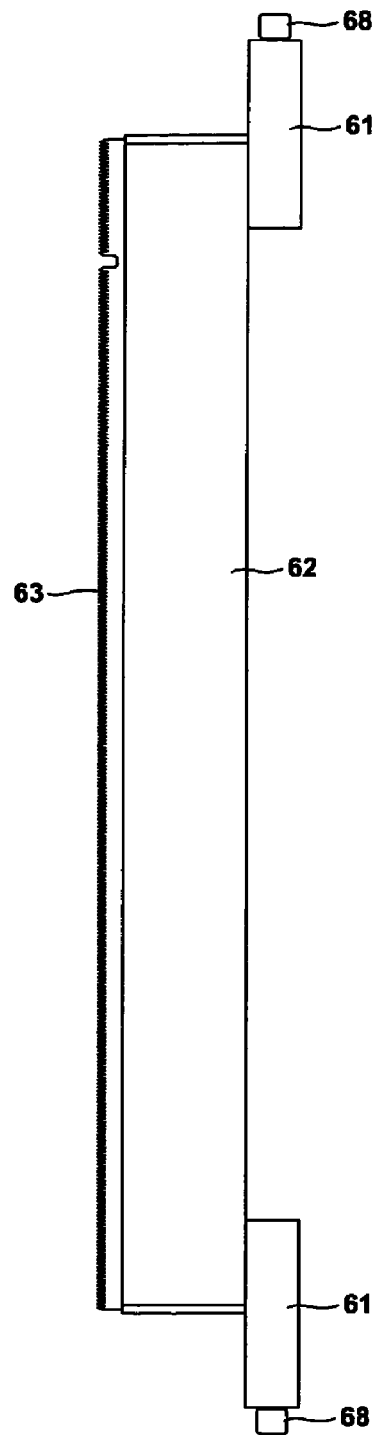
Figure 3F:
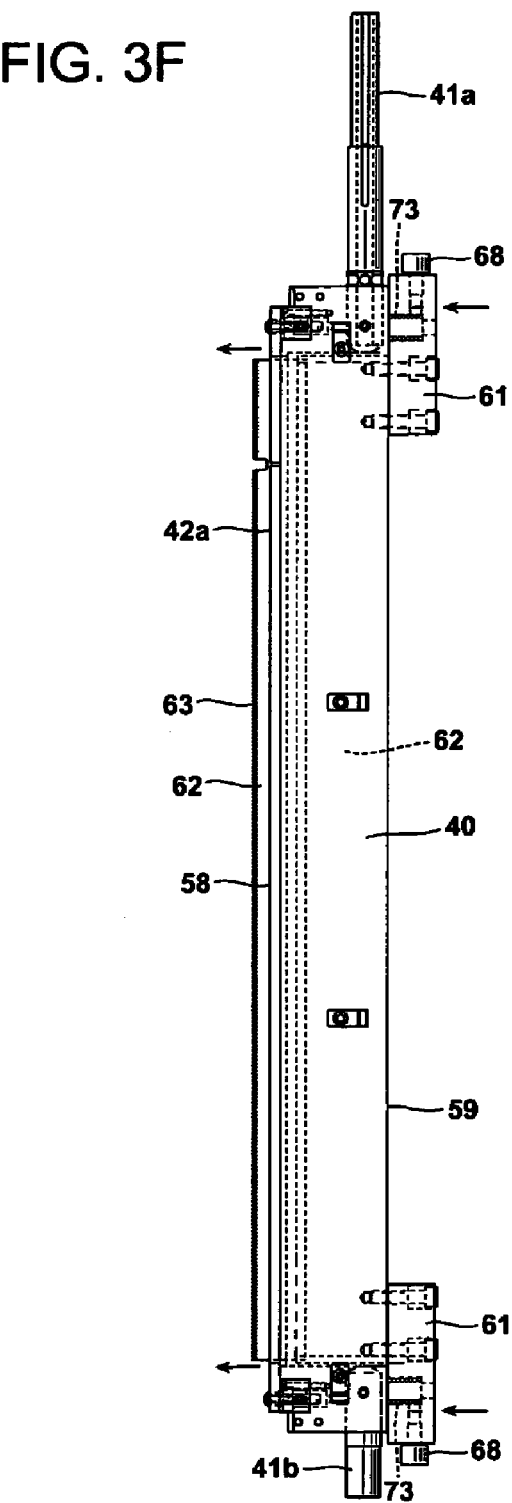

The cam followers 68 are attached to the perforation blade 62, which is slidably spring-biased inside the seal bar 40 via springs 73. As shown in FIG. 3D, springs 73 are attached at one end to mounting units 61 of perforation blade 62, and at the other end to the rear surface 59 of seal bar 40, which is opposite the contact surface 58 of seal bar 40. As the seal bar 40 rotates while making seals 28a, b, the cam followers 68 hit the relatively thick portion 71 of the cam profiles 70 every revolution, causing the cam followers 68 to move towards the rear surface 59 and contact surface 58 of the seal bar 40, which causes the perforation blade 62 to extend outwards from the seal bar 40, e.g., between transverse seal wires 42a, b, via slot 77 (FIG. 3C) in contact surface 58 of the seal bar. The outward extension of the perforation blade 62, i.e., the serrated edge 63 thereof, from seal bar 40 is shown in FIG. 3F, wherein the mounting units 61 of perforation blade 62 are pressed against the rear surface 59 of the seal bar 40, with springs 73 being in a fully compressed state.

Cams 66 are rotationally positionable by actuation of cam motor 72. When the motor 72 causes the cams 66 to be positioned such that the thick portion 71 of the cam profiles 70 are 180° opposite the drive roller 44, the serrated edge 63 of the perforation blade 62 contacts the film, and presses it against the drive roller to make a line of weakness 32. When the cams 66 are rotated such that the thick portion 71 of the cam profiles 70 are in any other position, the blade 62 will still extend every revolution, but the blade will not contact the film and a line of weakness 32 will not be formed. In this manner, packaging cushions may be formed having any desired number of containers 12, e.g., one, two, three, etc., disposed between pairs of the lines of weakness 32, wherein such container groups/packaging cushions are separable from film web 14 along the lines of weakness. For example, in the embodiment illustrated in FIGS. 1 and 4, packaging cushions 81 are being formed, each of which includes three containers 12, i.e., with three containers 12 disposed between pairs of lines of weakness 32.

As perhaps best shown in FIG. 4, the dispensing mechanism 34 includes a dispenser 78 with a discharge nozzle 79 through which fluid 17 exits the dispenser. Fluid 17, which may comprise two or more component fluids that are mixed within dispenser 78, e.g., component fluids 16a and 16b, may be supplied to the dispenser by any suitable means, e.g., from one or more supply drums via hose(s) and pump(s) (not shown, but schematically represented by the arrows 16a and 16b in the drawings). The dispenser 78 is structured and arranged to position the nozzle 79 within the film web 14 at the open longitudinal edge 22 as the web is conveyed along the path of travel, to thereby dispense the fluid 17 into the containers 12. Such dispensing mechanisms are well-known in the art, particularly those which mix polyols and isocyanates as component fluids to form polyurethane foam, which then expands and hardens within bags or other containers to form packaging cushions. See, e.g., U.S. Pat. Nos. 5,186,905, 5,950,875, 6,617,367, 6,675,557, 6,811,059, and 6,929,193, the disclosures of which are incorporated herein by reference in their entirety.

The first seal mechanism 26 forms transverse seals 28a, b in web 14 with a first end 84 and a second end 86, with the first end 84 being located at the closed longitudinal edge 20 and the second end 86 terminating a predetermined distance from the open longitudinal edge 22. An open skirt 88 may thus be formed, as provided by non-sealed edge regions of the juxtaposed film plies 18a, b at the open edge 22, within which the nozzle 79 of the dispenser 78 is positioned as the film web 14 is conveyed along the path of travel through apparatus 10. In this manner, both the positioning and function of the dispenser 78 may be separated from the first seal mechanism 26, with the two units operating independently from one another, unlike conventional systems for forming foam-tube packaging cushions. As a result, the spacing "W" between transverse seals 28a, b can be as narrow as desired, e.g., to create narrow-width, and therefore highly flexible, foam-tubes for packaging purposes. In addition, such de-coupling of the position and function of the dispenser 78 from the first seal mechanism 26 allows the dispenser to dispense the fluid 17 into the containers 12 as a continuous, non-intermittent flow between two or more containers, as described in further detail below.

In some embodiments, a film-spreading device 89 may be employed, e.g., upstream of the dispenser 78, in order to maintain the open edge 22 as an open skirt 88 for nozzle 79 (see FIG. 2).

The dispenser 78 may dispense the fluid 17 into the containers 12 as a continuous, non-intermittent flow between two or more containers. In this mode of operation, the first seal mechanism 26 may form a bridge seal 80 between transverse seals 28a, b of adjacent containers 12 to substantially prevent fluid 17 from being dispensed between the containers, i.e., into the bending regions 52. As perhaps most clearly shown in FIG. 4, bridge seal 80 is formed between transverse seals 28a, b at the second ends 86 thereof. The bridge seals 80 may be formed via bridge seal wire 82 between transverse seal wires 42a, b on seal bar 40 (see FIGS. 3B and 4). Relative to conventional systems, in which the system constraints require an intermittent, i.e., 'stop-start' dispensation of fluid into containers, with the dispensation being halted intermittently as each container is formed, a continuous flow of fluid in accordance with the present invention is advantageous in that it enables a greater degree of accuracy in the volume of fluid dispensed into each dispenser. Further, when mixing and dispensing two or more fluids, e.g., a mixture of a polyol and an isocyanate, continuous flow results in greater accuracy and consistency in the mixing ratio of the two components, i.e., relative to conventional intermittent-flow mixing/dispensing devices.

Second seal mechanism 36 forms longitudinal seal 38 adjacent the open longitudinal edge 22, and thus at least substantially encloses the fluid 16 within the containers 12. As described more fully in the above-incorporated U.S. Pat. No. 7,225,599, the second seal mechanism 36 may include a sealing roller 35 with one or more electrically-heated wires (not shown) on the circumference of the roller to effect the longitudinal seal 38 as a heat-seal, and a backing roller 37 to counter-rotate against the sealing roller 35, thereby creating a nip between the rollers 35, 37 to both facilitate the formation of the seal 38 and assist in the conveyance of the film web 14 through the apparatus 10 by pulling the film web past the dispensing mechanism 34. In this regard, belt 39 may be employed as shown in FIG. 2 to link the rotation of motor 46 to sealing roller 35, to thereby drive the rotation of sealing roller 35. Commutator rings 33 may be included as shown in FIG. 1, to supply electricity to the seal wire(s) disposed on the sealing roller 35. Further details regarding the construction and arrangement of second seal mechanism 36 may be found in the above-incorporated U.S. Pat. No. 7,225,599, e.g., with longitudinal seal 38 being continuous or discontinuous as desired.

As shown, the seal 38 may be spaced from the second ends 86 of the transverse seals 28, i.e., between the open longitudinal edge 22 and the second ends 86 of the transverse seals 28, to partially enclose the fluid 17 within the containers 12. Such spacing may be employed when dispenser 78 dispenses the fluid 17 into the containers 12 as a continuous, non-intermittent flow between two or more containers. In this mode of operation, some of the fluid 17 will be deposited on the second ends 86 of the transverse seals 28 and on the bridge seals 80. In many cases, it is difficult to form a heat-seal through a fluid. This is the case when fluid 17 is a foamable composition. By forming the longitudinal seal 38 with a gap spacing the longitudinal seal 38 from the bridge seals 80 as shown, the seal 38 can be made without also sealing through fluid 17. If desired, i.e., for redundancy, the second seal mechanism 36 may form a pair of parallel longitudinal seals 38 (only one shown), e.g., as taught in patent application Ser. No. 11/786,631, under Publication No. US-2008-0250753-A1, the disclosure of which is hereby incorporated herein by reference.

For applications in which fluid 17 is a mixture of a polyol, e.g., from 16a, and an isocyanate, e.g., from 16b, to form polyurethane foam, gas will be produced as a result of a chemical reaction between the foregoing reactants. For such applications, it is propitious for apparatus 10 to include a vent mechanism 90 for producing openings 92 in the film web 14 adjacent the closed longitudinal edge 20, which provide one or more vents in one or more of the containers 12 as shown.

As shown, the vent mechanism 90 may be in the form of a roller with outwardly projecting needles, which is urged against the lower part of the drive roller 44 so that, as the film web 14 passes between the vent mechanism 90 and drive roller 44, openings 92, e.g., in the form of needle holes, are formed in the film web near the closed edge 20. An actuating mechanism 87 may be included as shown, to move the roller 90 out of contact with the film web 14, and thereby cease the creation of openings 92, when desired, e.g., when dispenser 78 is subjected to an internal solvent flush (as is periodically done with polyurethane foam dispensers to prevent the foam from blocking the dispenser), in order to prevent the solvent from escaping the film web via the openings 92.

The vent mechanism 90 allows the gas produced from the foaming process to be released from the closed end of the containers 12, i.e., adjacent the closed longitudinal edge 20, which could otherwise prevent the foam from completely filling the containers 12. That is, without openings 92, gas produced by the foam-forming reaction could become trapped between the advancing foam and the closed edge 20, which would prevent the foam from reaching the ends 20 of the containers, thereby rendering the containers defective as packaging cushions. This problem is particularly acute when the containers 12 are tube-shaped, i.e., have a length ("L") to width ("W") ratio of 2:1 or more, and a foamable fluid 17 is introduced at the open end 22 of the container, such that expansion of the foam is the primary means relied upon for the foam to travel the length of, and thereby fill, the container. Advantageously, however, this manner of foam introduction and reliance upon foam growth to fill the tubes allows the tube-width to greatly reduced, e.g., down to about 1 inch or even less, as compared to tube-widths that are presently possible with currently-available foam-tube packaging techniques. The inclusion of openings 92 in the film web 14 adjacent the closed longitudinal edge 20 facilitates the ability to make foam-tubes with such small widths, such that ratios of up to about 24:1 are possible.

The ability to make foam-tubes with small widths may be further facilitated configuring apparatus 10, as shown, such that the film web 14 is conveyed in a substantially horizontal direction, with the containers 12 oriented in a substantially vertical configuration, wherein the open longitudinal edge 22 of the film web forms an upper opening into containers, and the closed longitudinal edge 20 forms a lower, closed end for the containers. The dispenser 78 is thus positioned to dispense the fluid 17 into the containers 12 in a substantially vertical, downward direction, such that gravity assists in the movement of the fluid to the closed ends 20 of the containers. With such configuration, it may be appreciated that the positioning of vent openings 92 near the closed edge 20 permits a gas-producing fluid 17, such as polyurethane foam, to reach the bottom of the containers 12, which would otherwise be difficult or impossible as trapped gas between the advancing foam and the closed edge 20 could prevent the foam from reaching the ends of the containers, particularly when the containers are tube-shaped as shown.

As illustrated in FIG. 4, four different packaging cushions 81a-d are depicted in various stages of production. Each cushion is defined between pairs of perforation lines 32, and include three containers 12. A greater or lesser number of containers 12 may be included within each cushion 81 as desired. Additionally, the number of containers within adjacent cushions may vary as desired, i.e., the number need not be the same as depicted, e.g., with cushion 81a having one container, cushion 81.b having three containers, cushion 81c having two containers, and cushion 81d having four containers. For simplicity of illustration, all cushions 81 are shown with three containers 12.

Cushion 81a includes containers 12a-c, which have just been formed in film web 14 by seal bar 40, and is separable from adjacent cushion 81b via perforation line 32. An opposing perforation line 32 separates cushion 81a from a cushion that is about to be made by seal bar 40. Containers 12a-c are empty, but will soon be filled with fluid 17 as the film web 14 is being conveyed along longitudinal direction 43 such that the containers 12a-c will be placed in moving succession beneath dispenser 78 to accept fluid 17 within the containers.

Packaging cushion 81b includes containers 12d-f, which are moving beneath dispenser 78 to accept a quantity of fluid 17. Container 12d is next to receive fluid 17, container 12e is receiving fluid 17, and container 12f has already received a quantify of fluid 17. In the illustrated embodiment, fluid 17 is a foamable composition, e.g., a mixture of a polyol from fluid source 16a and an isocyanate from fluid source 16b, which begins to expand immediately upon being introduced into the containers. In container 12e, the foamable fluid 17 expands in a downwards direction, i.e., towards closed edge 20, as indicated by the arrows, while being introduced into the container at open edge 22. Openings 92 allow the gas 93 generated by the foamable fluid 17 to escape the container 12e, so that the fluid 17 can expand all the way to the closed edge 20 and substantially completely fill the container, as has occurred in downstream containers 12g-1. Container 12f has moved past dispenser 78, and thus has received its full allotment of fluid 17, which expands outwards and downwards towards closed edge 20, with gas 93 escaping via vent hole openings 92 as shown.

Cushion 81c includes containers 12g-i, which are being sealed closed via second seal mechanism 36 after receiving an allotment of fluid 17. Container 12i has been sealed closed, container 12 h is being sealed closed, and container 12g will be sealed closed next. The resultant longitudinal seal 38 is being formed sufficiently above the second ends 86 of the transverse seals 28 that the seal is made before the expanding fluid 17 reaches the area in which the seal 38 is formed, in this manner, the foamable fluid 17 is forced to expand in a downward direction toward closed edge 20, thereby facilitating the substantially complete filling of the containers 12. The spacing between the second ends 86 and seal 38 also allows the seal 38 to be made substantially only between film plies 18a, b and not through the foamable fluid 17.

Cushion 81d is substantially complete, e.g., pending further curing and hardening of foam formed by foamable fluid 17, and is ready for separation from film web 14 via perforation line 32.

When containers 12 are oriented in a substantially vertical configuration, it may be useful to include a pair of support rollers 94 downstream of the second seal mechanism 36, as shown in FIGS. 1-2, to compress and drive the film web 14 therebetween, and thereby help support the weight of the fluid-filled film web. The support rollers 94 may thus help to prevent the web from being gravitationally pulled out of the nip between the sealing and backing rollers 35, 37.

Figure 5:
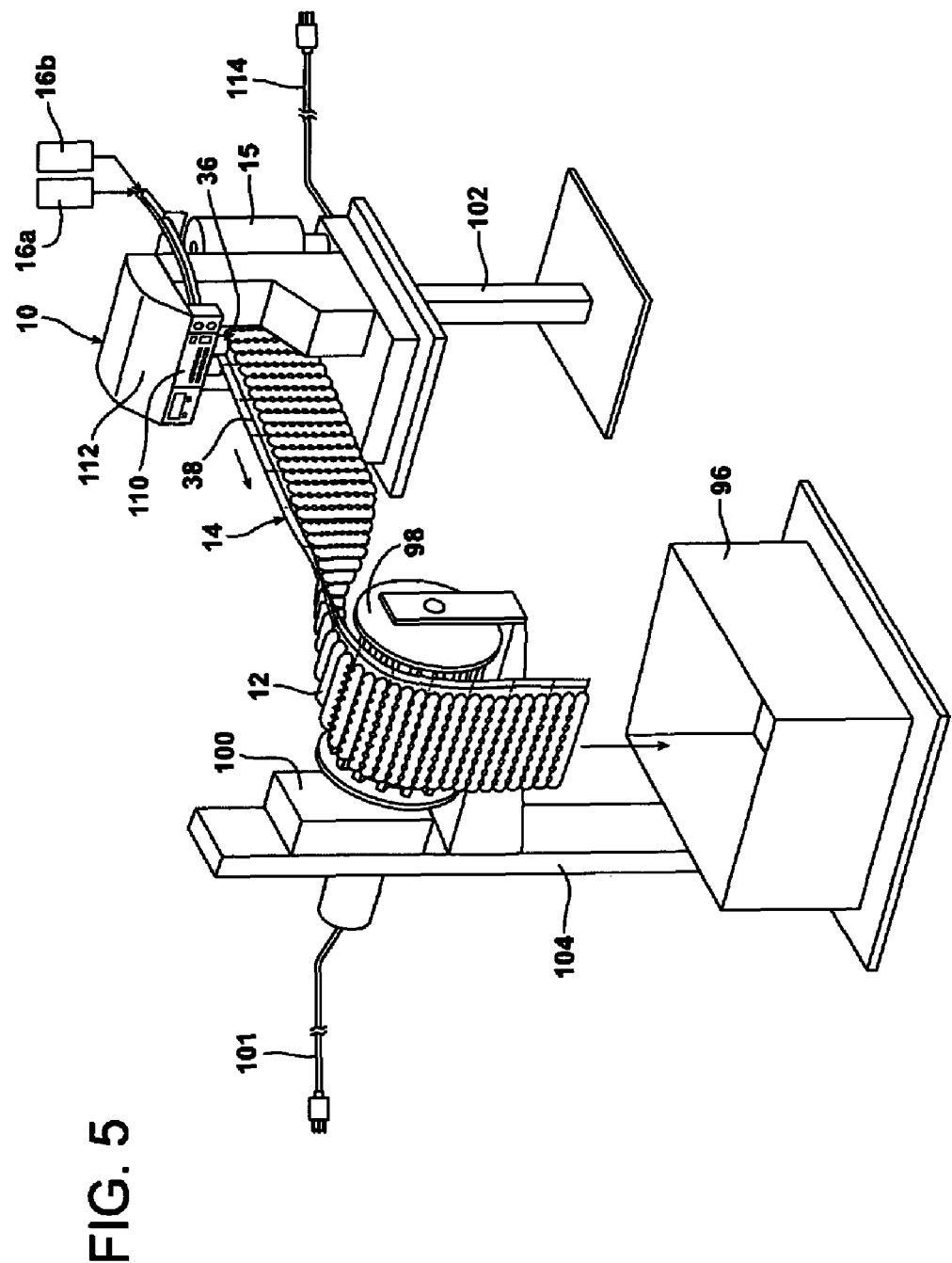
FIG. 5 is a perspective view of apparatus 10 with outer cover 112 thereon, guide roller 98, and accumulation bin 96.

As shown in FIG. 5, the fluid-filled film web 14 with completed containers 12, i.e., filled and sealed, may be directed into an accumulation bin 96 or the like for later retrieval, e.g., by a packaging operator. A guide roller 98, e.g., a horizontally-oriented paddle-wheel type roller with a motor 100 to power the rotation thereof, may be positioned downstream of second seal mechanism 36 to support the weight of the fluid-filled film web 14 and guide the web into the accumulation bin 96 or, if desired, simply onto the ground. The guide roller 98 supports the weight of the fluid-filled film web by changing the configuration of the containers 12 having fluid therein to a substantially horizontal orientation, so that each container can momentarily bear its weight upon the guide roller as the web is conveyed away from apparatus 10. As also shown in FIG. 5, both the apparatus 10 with film, roll 15 and guide roller 98 may be supported on respective stands 102 and 104.

FIG. 5 also shows apparatus 10 with an outer housing 112, operator interface 110, and an electrical cord 114 to supply power to apparatus 10, i.e., to the electrical components thereof as described above. An electrical cord 101 is also depicted for motor 100 for guide roller 98.

Film web 14 may comprise a flexible, thermoplastic film, and may be formed from any polymeric material capable of being formed into a flexible container as described herein. Non-limiting examples of suitable polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

Apparatus 10 and its various mechanisms may be controlled by any suitable controller capable of performing the functions specified herein, such as, e.g. a programmable logic controller (PLC), such devices being well known and commonly used in a variety of applications.

Figure 6:
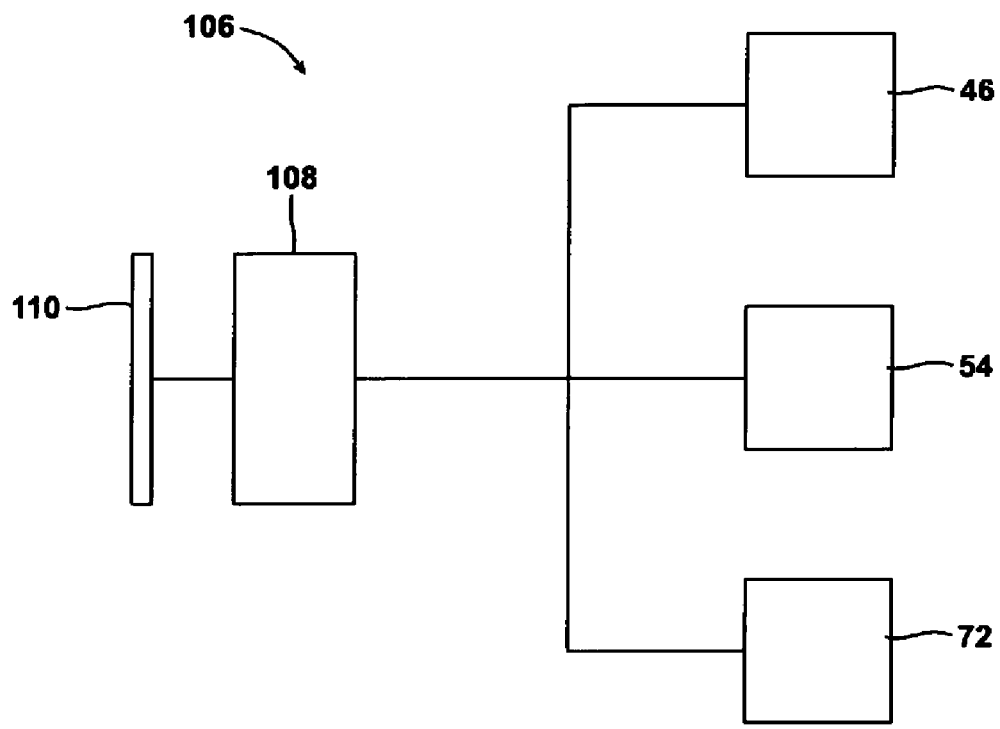
FIG. 6 is a schematic depiction of a control system 106 for apparatus 10.

More specifically, apparatus 10 may include a control system 106, as schematically illustrated in FIG. 6. The control system 106 may include a controller 108 with operator interface 110 in electrical/operative communication therewith. As shown in FIG. 5, operator interface 110 may be in the form of a control panel mounted on outer housing 112. Controller 108 may be in operative communication with, e.g., electrically and functionally connected to, drive motor 46, seal bar motor 54 and/or cam motor 72. In the manner, the controller 108 may control the power supplied to, and therefore the operation of, motors 46, 54 and/or 72.

Thus, for example, by controlling the operation of seal bar motor 54, i.e., the speed thereof and, therefore, the rotational speed of seal bar 40, the controller 108 may selectively control the frequency at which seal bar 40 contacts the film web 14, and thereby effect a desired distance between pairs of transverse seals 28a, b to form containers 12 having a desired width dimension "W" as described above.

Further, the speed at which film web 14 is conveyed by drive mechanism 24 may also be selectively controlled by controller 108, i.e., by controlling the speed of drive motor 46. The controller 108 may control the operation of drive motor 46 in conjunction with the control of seal bar motor 54 as a further means to control the width dimension "W" of the containers 12.

Additionally, controller 108 may control the actuation of cam motor 72 to thereby control the positioning of cams 66, i.e., to cause the thick portion 71 of the cam profiles 70 to be positioned 180° opposite the drive roller 44 at desired intervals based, e.g., on the rotational speed of seal bar 40, in order to create desired spacing of the lines of weakness 32, e.g., between every container 12, every other container, every third container (as shown in FIGS. 1 and 4), every $6^{th}$ container, etc. In this manner, the controller 108 selectively controls the cam device 64, thereby causing the perforation blade 62 to extend from the seal bar 40 and contact the film web 14 at selected intervals, so as to produce the lines of weakness 32 at desired intervals between containers 12.

Operator interface 110 is in electrical communication with controller 108, and allows an operator of apparatus 10 to select the foregoing parameters, i.e., the speed at which film web 14 is conveyed by drive mechanism 24, distance between pairs of transverse seals 28a, b to form containers 12 having a desired width dimension "W", the spacing of the lines of weakness 32, etc. Based on the input provided by the operator via interface 110, the controller 108 can determine and effect, e.g., the appropriate speed at which drive motor 46 will operate, the speed of rotation of seal bar motor 54, and the actuation intervals for cam motor 72, etc.

Many types of controllers are suitable for use as controller 108. Controller 108 may be an electronic controller, such as a printed circuit assembly containing a micro controller unit (MCU), which stores pre-programmed operating codes; a programmable logic controller (PLC); a personal computer (PC); or other such control device which allows the afore-described operation of apparatus 10 to be controlled via local control, e.g., via operator interface 110; remote control; pre-programmed control, etc.

The foregoing description of preferred embodiments of the invention has been presented for purposes of illustration and description it is not intended to be exhaustive or to limit the invention to the precise form disclosed, and modifications and variations are possible in light of the above teachings or may be acquired from practice of the invention.

What is claimed is:

1. An apparatus for forming flexible containers from a film web, dispensing fluid into said containers, and enclosing the fluid within the containers, said film web comprising a pair of juxtaposed film plies, a closed longitudinal edge at which said plies are joined, and an open longitudinal edge at which said plies are not joined, said apparatus comprising:
   a. a drive mechanism that conveys said film web along a path of travel at a predetermined speed;
   b. a first seal mechanism for producing pairs of transverse seals in said film web, said pairs of transverse seals bonding said juxtaposed film plies together and forming said containers therebetween, said first seal mechanism including a seal bar, which forms said transverse seals by contacting said film web at a frequency that is independent of said speed at which said film web is conveyed by said drive mechanism;
   c. a perforation mechanism for forming a line of weakness between any two of said containers, said perforation mechanism including a perforation blade, which forms said line of weakness by contacting said film web between transverse seals of adjacent containers at intervals that are independent of said frequency at which said seal bar contacts said film web, said perforation blade being integrated into and extendable from said seal bar to contact said film web to form said lines of weakness, and said perforation mechanism including a cam device, which is selectively controllable to cause said perforation blade to extend from said seal bar and contact said film web at desired intervals, thereby producing said lines of weakness at desired intervals;
   d. a dispensing mechanism for supplying the fluid to said containers, said dispensing mechanism including a dispenser with a discharge nozzle through which fluid exits said dispenser, said dispenser being structured and arranged to position said nozzle within said film web at said open longitudinal edge as the web is conveyed along said path of travel, to thereby dispense the fluid into said containers; and
   e. a second seal mechanism for forming a longitudinal seal between said film plies adjacent said open longitudinal edge such that the fluid is at least substantially enclosed within said containers.

2. The apparatus of claim 1, wherein the fluid dispensed by said dispensing mechanism is selected from polyols, isocyanates, and mixtures of polyols and isocyanates.

3. The apparatus of claim 2, further including a vent mechanism for producing openings in said film web adjacent said closed longitudinal edge, thereby forming one or more vents in one or more of said containers.

4. The apparatus of claim 2, wherein
   one or more containers are disposed between pairs of said lines of weakness; and
   said one or more containers are separable from said film web along said lines of weakness to form a packaging cushion.

5. The apparatus of claim 1, wherein said frequency at which said seal bar contacts said film web is selectively controllable to produce a desired distance between said pairs of transverse seals, thereby forming containers having a desired width dimension.

6. The apparatus of claim 5, wherein said speed at which said film web is conveyed by said drive mechanism is selectively controllable in conjunction with said selective control of said seal bar.

7. The apparatus of claim 5, wherein said seal bar is rotatable and rotates independently of the speed at which said film web is conveyed, except when in contact with said film web.

8. The apparatus of claim 5, wherein said containers are tube-shaped, with a length:width ratio of at least about 2:1.

9. The apparatus of claim 1, wherein said dispenser dispenses fluid into said containers as a continuous, non-intermittent flow between two or more containers.

10. The apparatus of claim 9, wherein said first seal mechanism forms a bridge seal between transverse seals of adjacent containers to substantially prevent fluid from being dispensed between said containers.

11. The apparatus of claim 1, wherein said first seal mechanism forms said transverse seals with a first end and a second end, wherein said first end is located at said closed longitudinal edge and said second end terminates a predetermined distance from said open longitudinal edge, thereby forming an open skirt, as provided by non-sealed edge regions of said juxtaposed film plies, within which said nozzle is positioned as said film web is conveyed along said path of travel.

12. The apparatus of claim 11, wherein said second seal mechanism positions said longitudinal seal between said open longitudinal edge and said second end of said transverse seals to partially enclose fluid within said containers.

13. The apparatus of claim 1, wherein said second seal mechanism forms a pair of longitudinal seals.

14. The apparatus of claim 1, wherein
   said dispenser is positioned to dispense fluid into said containers in a substantially vertical, downward direction.

15. The apparatus of claim 1, further including a vent mechanism for producing openings in said film web adjacent said closed longitudinal edge.

* * * * *